Patented Oct. 13, 1936

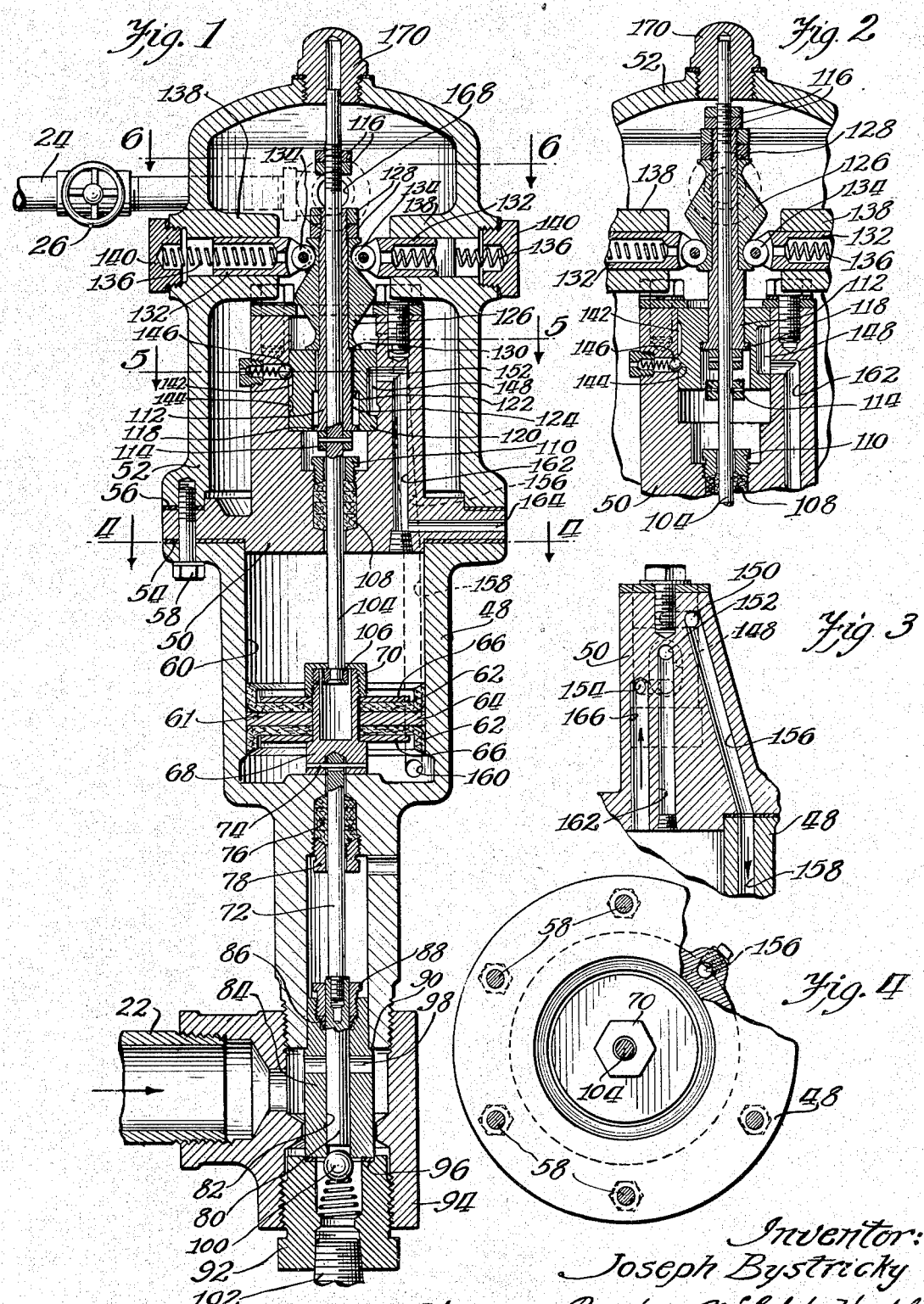

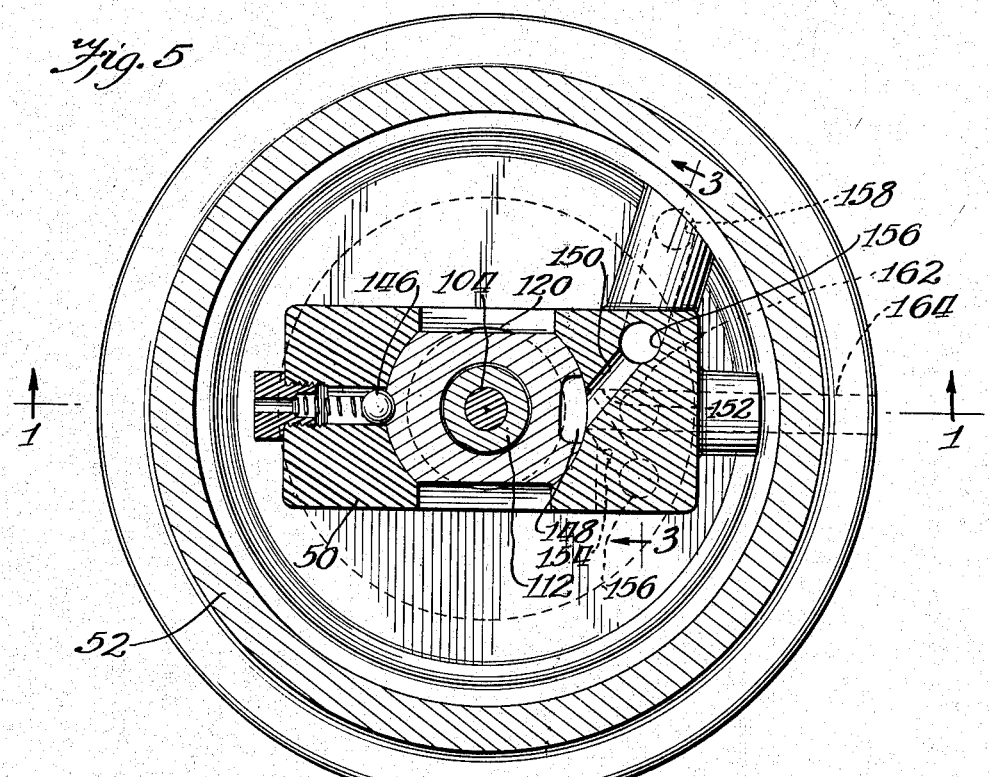
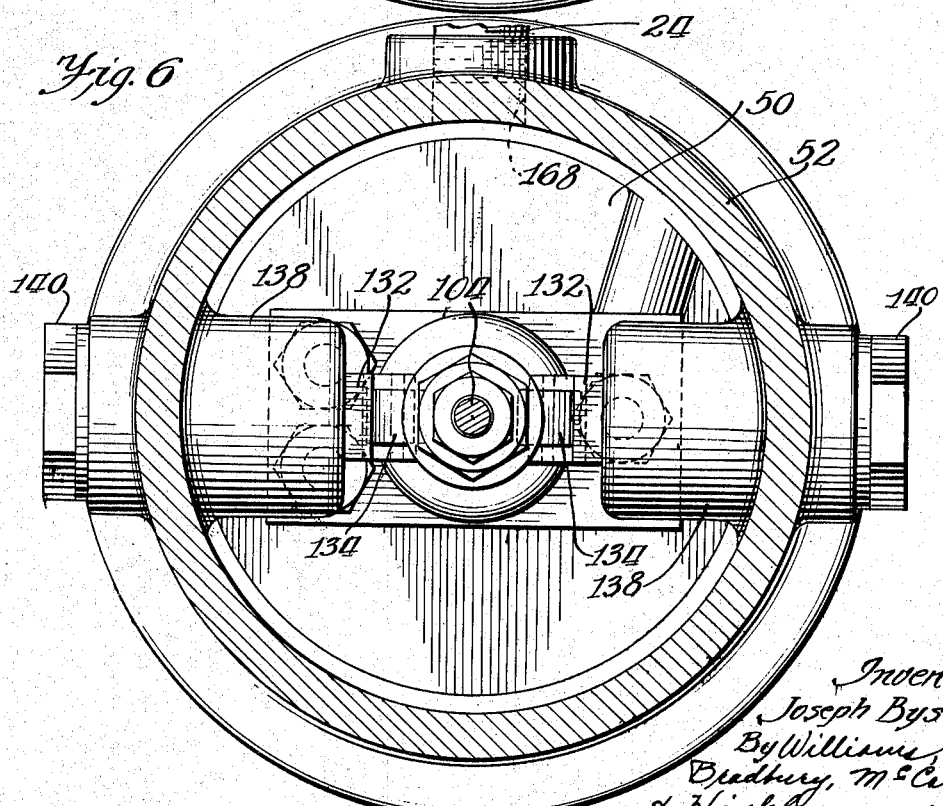

2,057,364

UNITED STATES PATENT OFFICE 2,057,364

FLUID PRESSURE MOTOR

Joseph Bystricky, Chicago, Ill., assignor, by mesne assignments, to Stewart-Warner Corporation, Chicago, Ill., a corporation of Virginia Original application February 24, 1932, Serial No. 594,781. Patent No. 1,990,524, dated February 12, 1935. Divided and this application October 5, 1934, Serial No. 747,006. In Canada February 10, 1933

3 Claims. (Cl. 121—164)

My invention relates generally to fluid operated motors, and more particularly to improvements in motors of this type usable for the operation of lubricant compressors.

It is an object of my invention to provide an improved air motor particularly adapted for the operation of lubricant compressors, which is simple in construction and reliable in operation.

A further object is to provide an improved valve mechanism for fluid pressure operated motors.

A further object is to provide an improved fluid pressure operated motor in which the possibility of the motor stopping at dead center is eliminated.

Other objects will appear from the following description, reference being had to the accompanying drawings, in which:

Fig. 1 is a central vertical sectional view of the motor of my invention shown as a part of a pneumatic lubricant pressure booster and taken on the line 1—1 of Fig. 5;

Fig. 2 is a fragmentary sectional view showing the valve mechanism of the motor in displaced position;

Fig. 3 is a vertical sectional view taken on the line 3—3 of Fig. 5;

Fig. 4 is a sectional view taken on the line 4—4 of Fig. 1, partly broken away to show an air passage way; and Figs. 5 and 6 are horizontal sectional views taken on the lines 5—5 and 6—6 of Fig. 1.

The present application is a division of my copending application, Serial No. 594,781, filed February 24, 1932, Patent No. 1,990,524, granted February 12, 1935, which discloses a lubricating system employing fluid operated motors of the type claimed herein.

The lubricant compressor illustrated comprises a cylinder casting 48 to which are secured a valve body 50 and a cap 52, suitable gaskets 54, 56 being interposed between these parts to make an air tight seal therebetween. The parts are drawn together by a plurality of cap screws 58. The cylinder casting has a cylindrical bore 60 formed therein to receive a piston 61 formed of a pair of oppositely facing cup leathers 62, a backing plate 64 and face plates 66, which are secured in assembled relation on an axially bored connector 68, being held thereon by a cap nut 70 threaded over the end of the connector. A connecting rod 72 has its upper end loosely joined to the connector 68 by means of a pin 74. The rod 72 is reciprocable through a suitable packing 76 held in place by a packing gland 78. A plunger 80 is threaded to the lower end of the connecting rod 72 and is reciprocable in the cylindrical bore 82 of a high pressure cylinder 84. The upper end of the cylinder 84 is counterbored to receive a hat-shaped sealing washer 86 held in place by a bushing 88. The cylinder 84 is provided with an external shoulder 90 which abuts against the lower end of the cylinder casting 48 and is held thereagainst by a bushing 92 which is threaded in an angle fitting 94, the latter being in turn threaded to the lower end of the cylinder casting 48. A gasket 96 is interposed between the end of the cylinder 84 and the bushing 92. Lubricant is supplied to the cylinder from a suitable source through a supply pipe 22, through the elbow fitting 94, inlet ports 98 formed in the cylinder 84, and is discharged past a spring-pressed ball check valve 100 which is held against the lower end of the cylindrical bore 82 by the bushing 92.

A suitable nipple or pipe 102 forms a discharge conduit to conduct the lubricant to the part to be supplied with lubricant, a hand operated valve being customarily provided in the discharge conduit to control the flow therethrough.

The piston 61 is adapted to be reciprocated by the alternate admission and exhaust of air under pressure to and from the cylinder 60 at the opposite sides of the piston 61. The mechanism devised for this purpose will now be described.

A valve rod 104 has a collar 106 riveted to its lower end, the collar being reciprocable within the bore of the connector 68. The valve rod extends upwardly through a suitable bore in the valve body 50, the escape of air being prevented by packing 108 and packing gland 110. A tubular sleeve 112 is freely slidable upon the valve rod 104, such sliding movement being limited by a collar 114 pinned to the valve rod 104 and a pair of nuts 116 threaded adjacent the upper end of the valve rod. The sleeve 112 has an annular flange 118 formed at its lower end. A slide valve 120 is freely movable relative to the sleeve 112, movement in one direction relative thereto being limited by the engagement of a shoulder 122 formed at the end of a counterbore 124 formed in the valve 120 with the flange 118. Movement of the valve 120 on the sleeve 112 in the opposite direction is limited by engagement of the valve with the lower end of a snap-over cam 126.

The cam 126 is rigidly secured upon the tubular sleeve 112 by means of a pair of nuts 128 which hold the cam against an annular shoulder 130 formed on the sleeve. A pair of plungers 132, each having a freely rotatable roller 134 carried at its inner end for engagement with the cam 126, are resiliently held in their innermost positions by springs 136. The plungers 132 are suitably guided in the bores of bosses 138 formed integrally with the cap 52, the ends of the bores being closed by plugs 140 which also serve as seats for the ends of the springs 136.

The slide valve 120 is provided with a longitudinally extending groove 142 and a depression 144 in alignment with said groove, said groove and depression being adapted to be engaged by a spring-pressed ball detent 146. The slide valve 120 is also provided with a short relatively wide groove 148 which is adapted alternately to connect ports 150 and 152, and 152 and 154.

The port 150 forms the end of a duct 156 formed in the valve body 50, the duct 156 communicating with a passageway 158 formed in the cylinder casting 48 and terminating in a port 160 adjacent the lower end of cylinder 60. The port 152 forms the end of an exhaust passageway 162 communicating with a horizontal passageway 164 which is open to the atmosphere. The port 154 is connected by means of an elbow-shaped passageway 166 with the upper end of cylinder 60. It will thus be apparent that the valve 120 is adapted alternately to connect the opposite ends of cylinder 60 with the atmosphere. When one end of the cylinder is thus connected with the atmosphere it will be noted that the slide valve uncovers the port to the opposite end of the cylinder, thereby permitting inflow of air under pressure from the inside of the cap 52, air under pressure being supplied to this cap through inlet port 168 from the pipe 32.

A dome-shaped plug 170, bored to receive the end of valve rod 104, is threaded at the top of cap 52 and may be removed when it is desired to adjust the positions of the nuts 116.

In the use of my invention the pipe 24 is connected to a suitable source of compressed air, the apparatus placed in condition for operation by opening the valve 26. The air supplied to the space within the casting 52 causes operation of the air motor in the following manner: Referring to Fig. 1, with the parts in the position shown, the air under pressure would flow through the passageway 156, 158, to the lower end of cylinder 60 and force the piston 61 upwardly, the upper end of the cylinder being connected to the atmosphere through the passageways 166, 148, 162, and 164. Shortly prior to the completion of the upward stroke of the air piston, the connector 68 will strike the lower end of the valve rod 104 and move the latter upwardly with it. Just prior to the completion of the upward stroke of the air piston 61, the central high portion of the cam 126 will be substantially in line with the axes of plungers 132 and the latter will ride over the high point of said cam and, due to the pressure exerted by the springs 146, force the cam 126 together with its sleeve 112 upwardly with a sudden snap action. During this sudden upward movement, the flange 118 of the sleeve 112 will abut against the shoulder 122 of the slide valve and shift the latter rapidly to its upper position, whereupon, as will be apparent, the upper end of the cylinder 60 will be placed in communication with the compressed air and the lower end thereof in communication with the atmosphere or with a lubricant tank as shown in my aforesaid patent. The spring pressed ball detent will hold the slide valve in its upper position until, as the air piston 61 moves downwardly, the cap 70 engages the collar 106 and moves the latter downward sufficiently to move the high point of the cam 126 past the center line of the plungers 132, whereupon the cycle will be repeated.

Reciprocation of the air piston 61 causes corresponding reciprocation of the lubricant plunger 72. As the plunger 72 is retracted, lubricant will flow from the pipe 22 into the cylinder 82. Upon the discharge stroke, the lubricant within the cylinder 82 will be displaced and forced past the check valve 100 into the lubricant discharge conduit 102.

With the valve 26 open, the air motor will operate continuously, reciprocating the pump plunger 80 and discharging lubricant through the outlet conduit 102. Operation of the air motor and pump will continue until the pressure in the conduit 102 attains a predetermined maximum pressure, sufficient to balance the air pressure upon the piston 61 of the air motor. However, when lubricant is permitted to escape from the conduit 102 and the pressure therein thereby lowered, the pump will immediately recommence operation. The pump will therefore be effective at all times automatically to maintain the lubricant in the discharge conduit 102 at high pressure. Due to the improved valve construction it will be practically impossible for the air motor to come to rest at a dead center position. It is therefore possible to use the air motor with a lubricant compressor of the type disclosed herein in which the operation of the motor is controlled by the discharge of lubricant. The motor may be stopped at any point in its stroke, and will automatically resume operation upon permitting the flow of lubricant from the discharge conduit.

The above described apparatus of my invention is, considering the results attained, of extremely simple construction and may be economically manufactured.

While I have disclosed but a single embodiment of my invention it will be apparent to those skilled in the art that numerous modifications thereof may be made without departing from the salient features of my invention. I therefore do not wish to be limited to the precise construction disclosed, but intend in the following claims to include such variations as will suggest themselves to those skilled in the art.

I claim:

1. An air motor for lubricant pumps comprising a cylinder having a piston reciprocable therein, means connected to said piston for operating the lubricant pump, a valve operating stem having a lost motion connection with said piston, a valve slidable relative to said stem and operable to control the flow of the air under pressure to the opposite ends of said cylinder, and a snapover mechanism cooperating with said stem for operating said valve, said snapover mechanism comprising a cam member mounted for limited sliding movement on said stem, a lost motion connection between said cam member and said valve, and resiliently operated means co-operable with said cam member to move it to its nearest end position.

2. An air motor comprising a cylinder, a piston reciprocable therein, a valve rod, a lost motion connection between said piston and said valve rod, a valve for controlling the admission to and exhaust of air from the ends of said cylinder, said valve being slidably mounted for limited movement relative to said rod, detent means for holding said valve in either one of two effective positions, and resilient snapover means acting upon said rod for shifting said valve, said snap-over means comprising a sleeve mounted for limited movement relative to said rod and connected with said valve by a lost motion connection, a cam having an intermediate high point and secured to said sleeve, and resilient means engageable with said cam rapidly to move the latter to one of its extreme positions after it has been partially moved thereto by said rod, whereby said cam will, through its lost motion connection with said valve, rapidly operate the latter.

3. An air motor comprising a cylinder, a piston reciprocable therein, a valve rod, a lost motion connection between said piston and said valve rod, a valve for controlling the admission to and exhaust of air from the ends of said cylinder, said valve being slidably mounted upon said rod, detent means for holding said valve in one position, a valve actuating element mounted for limited sliding movement relative to said valve, and resilient snapover means operable to shift said element, said last named means comprising a cam having a lost motion connection with said rod and with said valve, and spring pressed means for rapidly shifting said cam to one of its extreme positions when it has been moved past its central position by said rod, whereby said valve will be rapidly operated.

JOSEPH BYSTRICKY.